United States Patent
Oda et al.

(10) Patent No.: US 11,506,209 B2
(45) Date of Patent: Nov. 22, 2022

(54) CHARGE GAS COMPRESSOR TRAIN FOR ETHYLENE PLANT

(71) Applicant: MITSUBISHI HEAVY INDUSTRIES COMPRESSOR CORPORATION, Tokyo (JP)

(72) Inventors: Takashi Oda, Hiroshima (JP); Yusuke Oishi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 167 days.

(21) Appl. No.: 17/078,505

(22) Filed: Oct. 23, 2020

(65) Prior Publication Data
US 2021/0123446 A1 Apr. 29, 2021

(30) Foreign Application Priority Data
Oct. 25, 2019 (JP) .............................. JP2019-194584

(51) Int. Cl.
*F04D 17/12* (2006.01)
*F04D 25/04* (2006.01)
*F04D 29/28* (2006.01)

(52) U.S. Cl.
CPC ........... *F04D 17/12* (2013.01); *F04D 17/122* (2013.01); *F04D 25/04* (2013.01); *F04D 25/045* (2013.01); *F04D 29/284* (2013.01)

(58) Field of Classification Search
CPC ........ F04D 17/12; F04D 17/122; F04D 25/04; F04D 25/045; F04D 29/284; F04D 29/286; F04D 29/30; Y02P 30/40
See application file for complete search history.

(56) References Cited

U.S. PATENT DOCUMENTS

2018/0209728 A1* 7/2018 Iurisci .................. F25J 3/04133
2018/0238236 A1   8/2018 Carmone et al.

FOREIGN PATENT DOCUMENTS

| CN | 107061311 A | * | 8/2017 |
| EP | 3812597 A | * | 4/2021 |
| EP | 3816452 A | * | 5/2021 |
| JP | 2018-524519 A | | 8/2018 |
| JP | 2018150930 A | * | 9/2018 |
| WO | WO 2018/206102 A1 | * | 11/2018 |
| WO | WO 2020/049810 A | * | 3/2020 |

* cited by examiner

*Primary Examiner* — Charles G Freay
(74) *Attorney, Agent, or Firm* — Osha Bergman Watanabe & Burton LLP

(57) ABSTRACT

A charge gas compressor train for an ethylene plant includes: a steam turbine; and a compression unit that is configured to be driven by the steam turbine to compress a charge gas. The compression unit includes a closed impeller at each impeller of a plurality of compression stages. An outer diameter of blades of the closed impeller at least at an initial stage of the plurality of compression stages is 1,400 to 1,800 mm. A maximum operating peripheral speed of the blades of the closed impeller at the initial stage at an outermost diameter position is 350 to 400 m/s. An output of the charge gas compressor train is 100 to 140 MW.

5 Claims, 3 Drawing Sheets

CHARGE GAS COMPRESSOR TRAIN FOR ETHYLENE PLANT

BACKGROUND OF THE INVENTION

Field of the Invention

The present disclosure relates to a charge gas compressor train for an ethylene plant.

Priority is claimed on Japanese Patent Application No. 2019-194584, filed on Oct. 25, 2019, the content of which is incorporated herein by reference.

Description of Related Art

An ethylene plant is a facility for producing ethylene gas which is a raw material of a polyethylene product. In the ethylene plant, naphtha separated by distilling crude oil is used as a raw material of ethylene gas. In obtaining ethylene gas, a step of thermally decomposing the naphtha to generate a charge gas and a step of separating hydrocarbons in the charge gas according to the number of carbons are performed.

The naphtha is thermally decomposed to produce charge gas containing hydrocarbons having a lower molecular weight. Specifically, in this step, the naphtha is allowed to flow through a hot pipe together with water vapor. The naphtha is spontaneously thermally decomposed at a high temperature and a molecular chain is broken to obtain hydrocarbons having a low molecular weight. In this state, as an example, a plurality of molecules such as ethylene, propylene, or the like are mixed in the charge gas. By distilling this charge gas in the subsequent distillation step, the molecules are separated for each carbon number. Here, the distillation step is performed based on gas-liquid equilibrium between the charge gas and the steam at a high temperature. Accordingly, it is necessary to compress and liquefy the charge gas. Therefore, the ethylene plant includes a compressor for compressing the charge gas and a driving source (for example, a steam turbine) for driving the compressor (see Published Japanese Translation No. 2018-524519 of the PCT International Publication).

The compressor described in Published Japanese Translation No. 2018-524519 of the PCT International Publication has an open impeller having a disc-shaped disc and a plurality of blades arranged on one surface of the disc.

SUMMARY OF THE INVENTION

Here, an open impeller does not have a shroud (cover) that covers a blade. Accordingly, the amount of gas leakage tends to be larger than that of a closed impeller having the shroud. As a result, efficiency of the compressor may be deteriorated.

In order to compensate this deterioration in efficiency, it is necessary to increase the number of impellers and increase a diameter of the impeller. As a result, a dimension of the compressor may excessively increase, which may lead to an increase in construction cost and maintenance cost.

The present disclosure has been made to solve the above problems, and an object of the present disclosure is to provide a charge gas compressor train for an ethylene plant having a smaller size and an increased capacity.

In order to solve the above problems, according to an aspect of the present disclosure, a charge gas compressor train for an ethylene plant is provided, the compressor including: a steam turbine; and a compression unit that is driven by the steam turbine to compress a charge gas, in which the compression unit includes a closed impeller at each impeller of a plurality of compression stages, an outer diameter of a blade of the closed impeller at least at an initial stage of the plurality of compression stages is 1,400 to 1,800 mm, a maximum operating peripheral speed of the blade of the closed impeller at the initial stage at an outermost diameter position is 350 to 400 m/s, and an output of the charge gas compressor train is 100 to 140 MW.

According to the present disclosure, it is possible to provide a charge gas compressor train for an ethylene plant having a smaller size and an increased capacity.

DETAILED DESCRIPTION OF THE INVENTION

Figure 2:
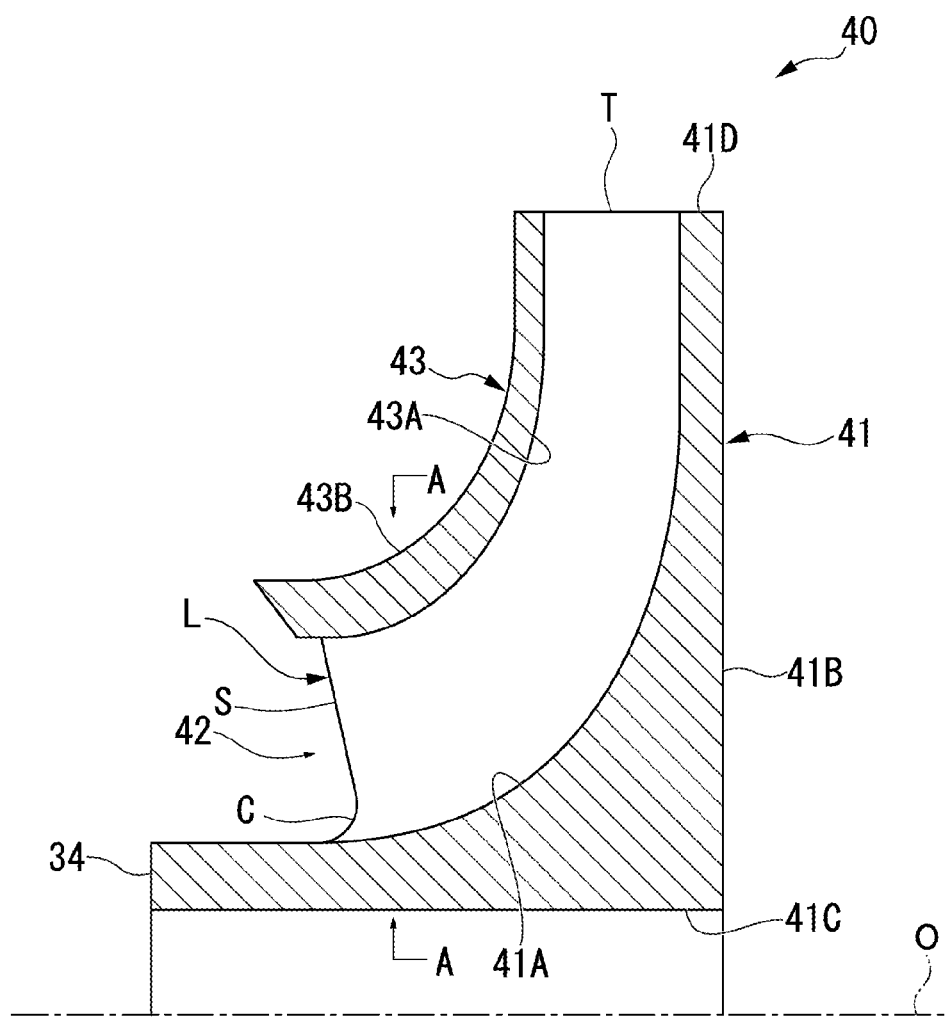
FIG. 2 is an enlarged cross-sectional view of main parts of the compression unit according to the embodiment of the present disclosure.
Figure 3:
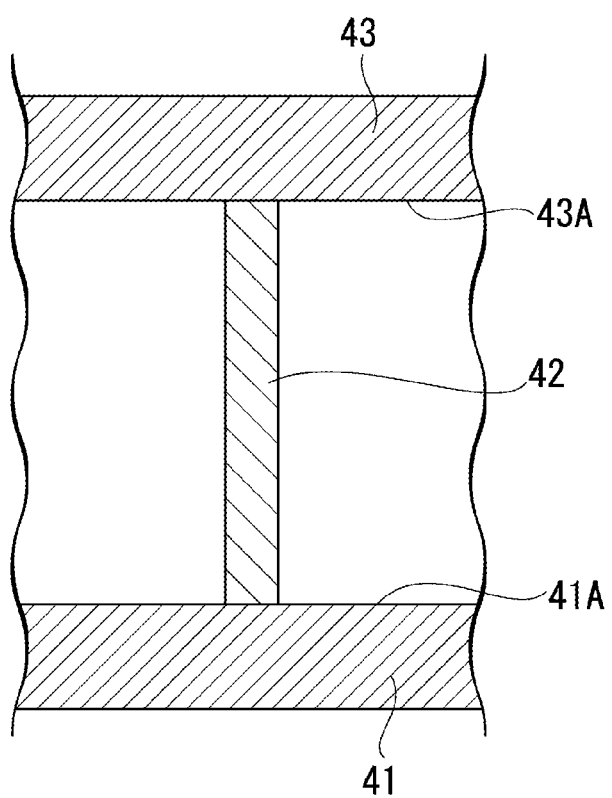
FIG. 3 is a view taken along a line A-A of FIG. 2.

Hereinafter, a charge gas compressor train 1 for an ethylene plant (hereinafter, referred to as a compressor train 1) according to an embodiment of the present disclosure will be described with reference to FIGS. 1 to 3. The compressor train 1 is an ethylene plant that produces an ethylene gas and is used to compress the charge gas. The compressor train 1 according to the present embodiment has an output of 100 to 140 MW, and thus is particularly suitably used for a large-scale ethylene plant capable of producing 3 million tons of ethylene gas per year.

An ethylene plant is a facility for producing ethylene gas which is a raw material of a polyethylene product. In the ethylene plant, naphtha separated by distilling crude oil is used as a raw material of ethylene gas. In obtaining ethylene gas, a step of thermally decomposing the naphtha to generate a charge gas and a step of separating hydrocarbons in the charge gas according to the number of carbons are performed.

The naphtha is thermally decomposed to produce charge gas containing hydrocarbons having a lower molecular weight. Specifically, in this step, the naphtha is allowed to flow through a hot pipe together with water vapor. The naphtha is spontaneously thermally decomposed at a high temperature and a molecular chain is broken to obtain hydrocarbons having a low molecular weight. In this state, as an example, a plurality of molecules such as ethylene, propylene, or the like are mixed in the charge gas. By distilling this charge gas in the subsequent distillation step, the molecules are separated for each carbon number. Here, the distillation step is performed based on gas-liquid equilibrium between the charge gas and the steam at a high temperature. Accordingly, it is necessary to compress and liquefy the charge gas. For this reason, the ethylene plant is equipped with a compressor train 1.

Figure 1:
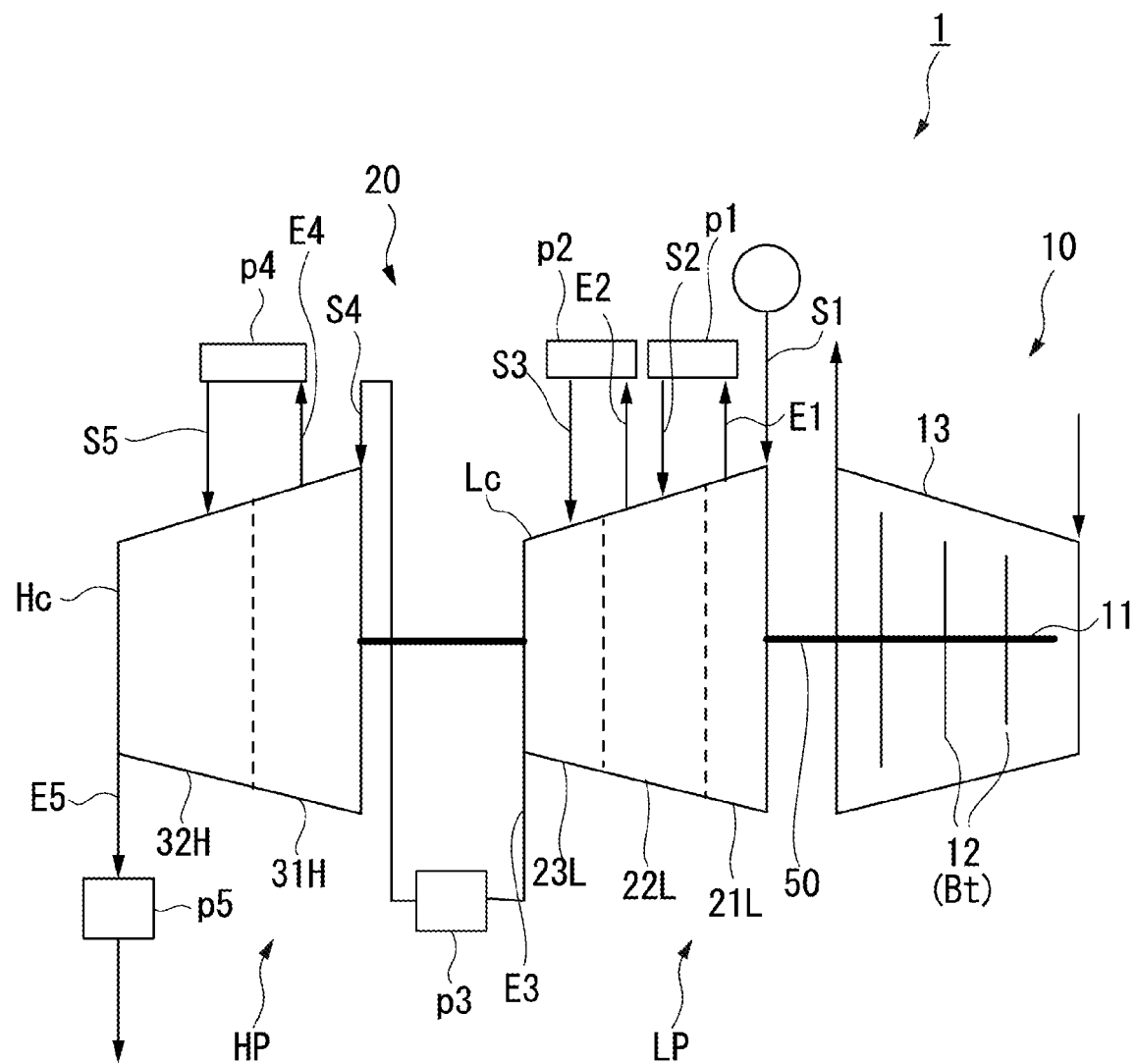
FIG. 1 is a schematic view showing a configuration of a compressor train according to an embodiment of the present disclosure.

As shown in FIG. 1, the compressor train 1 includes a steam turbine 10 and a compression unit 20. The steam turbine 10 includes a rotating shaft 11, a stage 12 formed of a plurality of turbine blades Bt provided on an outer peripheral surface of the rotating shaft 11, a turbine casing 13 that covers the rotating shaft 11 and the turbine blades Bt from an outer peripheral side. The steam turbine 10 includes a plurality of the stages 12. The number of stages 12 is desirably is 13. In addition, although not shown in detail, nozzles (turbine vanes) are provided on an inner peripheral side of the turbine casing 13 so as to alternate with the turbine blades Bt. The high-temperature and high-pressure steam introduced into the turbine casing 13 collides with the turbine blades Bt to apply a rotational force to the rotating shaft 11.

This rotational force is used to drive the compression unit 20 through a driving shaft 50 connected to a shaft end.

In addition, a length of a portion of the rotating shaft 11 protruding from the turbine casing 13 is 1,000 to 1,500 mm.

The steam turbine 10 preferably has an inlet flow rate of 1,000 to 1,200 t/h, a bleed air flow rate of 700 to 1,000 t/h, and an upper limit of a rotation rate of 4,500 rpm. In addition, the steam turbine 10 includes an inner bar type control valve.

The compression unit 20 includes a low pressure compression unit LP, a high pressure compression unit HP, and the driving shaft 50.

The low pressure compression unit LP and the high pressure compression unit HP are connected via the common driving shaft 50. In other words, the low pressure compression unit LP and the high pressure compression unit HP are both driven by rotating the driving shaft 50 by the steam turbine 10.

As will be described later in detail, the low pressure compression unit LP and the high pressure compression unit HP have a plurality of impellers 40 (see FIG. 2) and casings that cover these impellers 40 from the outside. The casing of the low pressure compression unit LP (low pressure casing Lc) and the casing of the high pressure compression unit HP (high pressure casing Hc) are independent of each other. In other words, the compressor train 1 includes only three casings in total including a turbine casing 13 of the steam turbine 10.

The low pressure compression unit LP includes a plurality of (three) sections 21L, 22L, and 23L. The charge gas flows into the sections 21L, 22L, and 23L until the charge gas is discharged from the low pressure casing Lc. These sections 21L, 22L, and 23L are arranged in this order from an upstream side to a downstream side along a flow direction of the charge gas.

In the first low pressure section 21L positioned at the uppermost stream side, a first low pressure introduction unit S1 into which the charge gas generated in the preceding process in the ethylene plant is introduced, and a first low pressure discharge unit E1 which discharges the charge gas compressed in the first low pressure section 21L. The charge gas discharged from the first low pressure discharge unit E1 is sent to the adjacent second low pressure section 22L via a processing unit p1 that performs a predetermined process included in the ethylene plant with respect to the charge gas.

The second low pressure section 22L is provided on the downstream side of the first low pressure section 21L. The second low pressure section 22L includes a second low pressure introduction unit S2 for introducing the charge gas supplied from the processing unit p1, and a second low pressure discharge unit E2 for discharging the charge gas further compressed in the second low pressure section 22L. The charge gas discharged from the second low pressure discharge unit E2 is sent to the adjacent third low pressure section 23L via a processing unit p2 that performs a predetermined process with respect to the charge gas.

The third low pressure section 23L is provided on the downstream side of the second low pressure section 22L. The third low pressure section 23L includes a third low pressure introduction unit S3 for introducing the charge gas supplied from the processing unit p2, and a third low pressure discharge unit E3 for discharging the charge gas further compressed in the third low pressure section 23L. The charge gas discharged from the third low pressure discharge unit E3 is sent to the high pressure compression unit HP via a processing unit p3 that performs a predetermined process with respect to the charge gas.

In a similar manner as the low pressure compression unit LP, the high pressure compression unit HP includes a plurality of (two) sections 31H and 32H. The charge gas flows into the sections 31H and 32H until the charge gas is discharged from the high pressure casing Hc. These sections 31H and 32H are arranged in this order from the upstream side to the downstream side along the flow direction of the charge gas.

The first high pressure section 31H positioned at the uppermost stream side includes a first high pressure introduction unit S4 into which the charge gas compressed by the low pressure compression unit LP is introduced, and a first high pressure discharge unit E4 for discharging the charge gas compressed in the first high pressure section 31H. The charge gas discharged from the first high pressure discharge unit E4 is sent to the adjacent second high pressure section 32H via a processing unit p4 that performs a predetermined process included in the ethylene plant with respect to the charge gas.

The second high pressure section 32H is provided on the downstream side of the first high pressure section 31H. The second high pressure section 32H includes a second high pressure introduction unit S5 for introducing the charge gas supplied from the processing unit p4, and a second high pressure discharge unit E5 for discharging the charge gas further compressed in the second high pressure section 32H. The charge gas discharged from the second high pressure discharge unit E5 is sent to a processing unit p5 that performs a predetermined process with respect to the charge gas. The temperature of the charge gas discharged from each of the above sections 21L, 22L, 23L, 31H, and 32H is 80° C. to 120° C.

The first low pressure section 21L, the second low pressure section 22L, the third low pressure section 23L, the first high pressure section 31H, and the second high pressure section 32H have a plurality of impellers 40, respectively. In other words, each section has a plurality of compression stages formed by one impeller 40. As an example, in the compressor train 1 according to the present embodiment, the low pressure compression unit LP includes four compression stages and the high pressure compression unit HP includes six compression stages.

In addition, although not shown in detail, in the casing of the low pressure compression unit LP (low pressure casing Lc), one nozzle is provided on each of both sides of the driving shaft 50 in the extending direction. These nozzles extend so as to protrude from the low pressure casing Lc so as not to interfere with the casing (high pressure casing Hc) of the high pressure compression unit HP and the casing (turbine casing 13) of the steam turbine 10.

Next, the configuration of the impeller 40 will be described with reference to FIGS. 2 and 3. As shown in FIG. 2, the impeller 40 includes a disc 41, a blade 42, and a shroud 43. The disc 41 has a disc shape centered on a central axis (axis O) of the driving shaft 50 described above. The surface of the disc 41 facing one side in an axis O direction is a disc main surface 41A. The disc main surface 41A is curved outward in a radial direction as it goes from one side toward the other side in the axis O direction. A plurality of blades 42 are arranged on the disc main surface 41A. The blades 42 will be described later. The surface facing the side opposite to the disc main surface 41A is a disc back surface 41B. A surface of the disc 41 facing inward in the radial direction is a disc inner peripheral surface 41C. The disc inner peripheral surface 41C is in contact with an outer peripheral surface of the driving shaft 50. The surface of the disc 41 facing outward in the radial direction is a disc outer peripheral surface 41D.

The plurality of blades 42 are provided on the disc main surface 41A at intervals in a circumferential direction. Each blade 42 extends along the disc main surface 41A from a leading edge L which is an edge on one side in the axis O direction to a trailing edge T which is an edge on the other side. In other words, the blade 42 extends from the inner side toward the outer side in the radial direction from the one side toward the other side in the axis O direction.

The leading edge L has a straight portion S and a curved portion C. The straight portion S linearly extends towards the other side in the axis O direction, as it goes from the outer side toward the inner side in the radial direction. In other words, the straight portion S recedes toward the other side in the axis O direction with respect to the radial direction. The curved portion C is gradually curved toward the one side in the axis O direction as it goes from the inner end of the straight portion S in the radial direction toward the inner side in the radial direction. More specifically, the curved portion C has a curved shape protruding inward in the radial direction.

In the initial stage (that is, the first stage impeller 40 in the first low pressure section 21L) of the low pressure compression unit LP, an outer diameter of the blade 42 (that is, a length from the axis O to the trailing edge T in a radial direction) is 1,400 to 1,800 mm. In addition, a rotation rate of the driving shaft 50 is select such that a maximum operating peripheral speed of the blade 42 at an outermost diameter position is 350 to 400 m/s.

The shroud 43 has a funnel shape that covers the plurality of blades 42 from the outer peripheral side.

A shroud inner peripheral surface 43A, which is a surface of the shroud 43 facing the inner side in the radial direction, is connected to an outer edge of the blade 42 in the radial direction. The shroud inner peripheral surface 43A extends from the inner side toward the outer side in the radial direction as it goes from the one side toward the other side in the axis O direction. In the same manner as the shroud inner peripheral surface 43A, a shroud outer peripheral surface 43B, which is a surface of the shroud 43 facing the outer side in the radial direction, extends from the inner side to the outer side in the radial direction as it goes from one side to the other side in the axis O direction. In the present embodiment, a thickness of the shroud 43 on the outer side in the radial direction is larger than that of a shroud applied to a closed impeller of the related art. The angle of the blade 42 with respect to the disc 41 and the shroud 43 is larger than 0° and smaller than 90°.

By using such a configuration of the blade 42, it is possible to sufficiently resist against the stress applied to the blade 42, even when the impeller 40 is rotated at a high peripheral speed (350 to 400 m/s) as described above.

In addition, according to the configuration described above, each impeller 40 in each compression stage is a closed impeller, and accordingly, a leakage amount of charge gas can be reduced. On the other hand, as compared to a case where the impeller 40 does not have the shroud 43 (that is, the case where the impeller 40 is an open impeller), the leakage amount of the charge gas between the shroud 43 and the inner peripheral surface of the casing may increase. However, in the structure according to the present embodiment, it is possible to reduce the possibility of such leakage. Therefore, the work amount per compression stage can be increased without increasing the number of impellers 40 or increasing the impeller diameter. As a result, it is possible to increase the capacity of the compressor train 1.

According to the configuration described above, since a temperature of the charge gas discharged from each of the sections 21L, 22L, 23L, 31H, and 32H is 80 to 120° C., fouling is likely to occur in the charge gas. However, since each compression stage has the impeller 40 as a closed impeller rather than an open impeller, the fouling is less likely to directly collide with the blade 42. As a result, it is possible to reduce the possibility of a damage or wear on the blade 42.

According to the configuration described above, the high pressure compression unit HP and the low pressure compression unit LP includes the plurality of sections, respectively. Accordingly, the capacities of the high pressure compression unit HP and the low pressure compression unit LP can be increased. In addition, the high pressure compression unit HP and the low pressure compression unit LP have the high pressure casing Hc and the low pressure casing Lc provided separately from each other, respectively. Accordingly, the charge gas compressor train 1 for an ethylene plant can be configured with only three casings in total including the turbine casing 13 of the steam turbine 10. In other words, the capacity of the compression unit 20 can be increased while suppressing the dimension of the device.

According to the configuration described above, the low pressure compression unit LP includes a larger number of sections than the high pressure compression unit HP. Accordingly, after the charge gas is sufficiently compressed in the low pressure compression unit LP, the charge gas can be further compressed in the high pressure compression unit HP. Therefore, a load required for the high pressure compression unit HP can be suppressed to be small. As a result, it is possible to reduce the dimensions of the high pressure compression unit HP.

According to the configuration described above, since the steam turbine 10 is an impulse type, it is possible to ensure a large heat drop per stage in the steam turbine 10. As a result, since the number of stages can be kept small, it is possible to reduce the dimension of the steam turbine 10.

As described above, the embodiment of the present disclosure has been described in detail with reference to the drawings, but the specific configuration is not limited to this embodiment and may include design changes and the like without departing from the scope of the present disclosure.

APPENDIX

A device X in each embodiment is understood as follows, for example.

(1) The charge gas compressor train 1 for an ethylene plant according to a first aspect includes: the steam turbine 10; and the compression unit 20 that is driven by the steam turbine 10 to compress a charge gas, the compression unit 20 includes a closed impeller 40 at each impeller of a plurality of compression stages, an outer diameter of the blade 42 of the closed impeller 40 at least at an initial stage of the plurality of compression stages is 1,400 to 1,800 mm, a maximum operating peripheral speed of the blade 42 of the closed impeller 40 at the initial stage at an outermost diameter position is 350 to 400 m/s, and an output of the charge gas compressor train is 100 to 140 MW.

According to the configuration described above, each impeller 40 at each compression stage is a closed impeller, and accordingly, it is possible to reduce the leakage amount of the charge gas. Therefore, the work amount per compression stage can be increased without increasing the number of impellers 40 or increasing the impeller diameter.

(2) In the charge gas compressor train 1 for an ethylene plant according to a second aspect, the compression unit 20 includes a plurality of sections. The charge gas flows into the plurality of sections until the charge gas is discharged from the compression unit 20, and a temperature of the charge gas discharged from each section is 80° C. to 120° C.

According to the configuration described above, since the temperature of the charge gas discharged from each section is 80° C. to 120° C., the fouling is likely to occur in the charge gas. However, since each compression stage has a closed impeller, rather than an open impeller, the fouling is less likely to collide directly with the blade 42. As a result, it is possible to reduce the possibility of a damage or wear on the blade 42.

(3) In the charge gas compressor train 1 for an ethylene plant according to a third aspect, the compression unit 20 includes the high pressure compression unit HP having the high pressure casing Hc, and the low pressure compression unit LP having the low pressure casing Lc provided separately from the high pressure casing Hc, and the high pressure compression unit HP and the low pressure compression unit LP include the plurality of sections, respectively.

According to the configuration described above, the high pressure compression unit HP and the low pressure compression unit LP includes the plurality of sections, respectively. Accordingly, the capacities of the high pressure compression unit HP and the low pressure compression unit LP can be increased. In addition, the high pressure compression unit HP and the low pressure compression unit LP have the high pressure casing Hc and the low pressure casing Lc provided separately from each other, respectively. Therefore, the charge gas compressor train 1 for an ethylene plant can be configured with only three casings in total including the casing (the turbine casing 13) of the steam turbine 10. In other words, the capacity of the compression unit 20 can be increased while suppressing the dimension of the device.

(4) In the charge gas compressor train 1 for an ethylene plant according to a fourth aspect, the low pressure compression unit LP includes a larger number of sections than the high pressure compression unit HP.

According to the configuration described above, the low pressure compression unit LP includes a larger number of sections than the high pressure compression unit HP. Accordingly, after the charge gas is sufficiently compressed in the low pressure compression unit LP, the charge gas can be further compressed in the high pressure compression unit HP. Therefore, a load required for the high pressure compression unit HP can be suppressed to be small. As a result, it is possible to reduce the dimensions of the compression unit 20.

(5) In the charge gas compressor train 1 for an ethylene plant according to a fifth aspect, the steam turbine 10 includes a rotating shaft 11 connected to the same shaft of the compression unit 20, and the plurality of stages 12 formed of the plurality of turbine blades Bt arranged on the outer peripheral surface of the rotating shaft 11, and the steam turbine 10 is an impulse type in which the steam introduced from the outside at each stage 12 collides with the turbine blades Bt to apply a rotational force to the rotating shaft 11.

According to the configuration described above, since the steam turbine 10 is an impulse type, it is possible to ensure a large heat drop per stage in the steam turbine 10. As a result, since the number of stages can be kept small, it is possible to reduce the dimensions of the steam turbine 10.

EXPLANATION OF REFERENCES

1 Charge gas compressor train for ethylene plant (compressor train)
10 Steam turbine
11 Rotating shaft
12 Stage
13 Turbine casing
20 Compression unit
21L First low pressure section
22L Second low pressure section
23L Third low pressure section
31H First high pressure section
32H Second high pressure section
40 Impeller
41 Disc
41A Disc main surface
41B Disc back surface
41C Disc inner peripheral surface
41D Disc outer peripheral surface
42 blade
L leading edge
S Straight portion
C Curved portion
T Trailing edge
43 Shroud
43A Shroud inner peripheral surface
43B Shroud outer peripheral surface
50 Driving shaft
S1 First low pressure introduction unit
S2 Second low pressure introduction unit
S3 Third low pressure introduction unit
S4 First high pressure introduction unit
S5 Second high pressure introduction unit
E1 First low pressure discharge unit
E2 Second low pressure discharge unit
E3 Third low pressure discharge unit
E4 First high pressure discharge unit
E5 Second high pressure discharge unit
Hc High pressure casing
Lc Low pressure casing
O axis
p1, p2, p3, p4, p5 Processing unit

What is claimed is:

1. A charge gas compressor train for an ethylene plant, the compressor comprising:
   a steam turbine; and
   a compression unit that is configured to be driven by the steam turbine to compress a charge gas, wherein
   the compression unit includes a closed impeller at each impeller of a plurality of compression stages,
   an outer diameter of blades of the closed impeller at least at an initial stage of the plurality of compression stages is 1,400 to 1,800 mm,
   a maximum operating peripheral speed of the blades of the closed impeller at the initial stage at an outermost diameter position is 350 to 400 m/s, and
   an output of the charge gas compressor train is 100 to 140 MW.

2. The charge gas compressor train for an ethylene plant according to claim 1, wherein the compression unit includes a plurality of sections through which the charge gas flows until the charge gas is discharged from the compression unit, and a temperature of the charge gas discharged from each section is 80° C. to 120° C.

3. The charge gas compressor train for an ethylene plant according to claim 2, wherein the compression unit includes a high pressure compression unit having a high pressure casing, and a low pressure compression unit having a low pressure casing provided separately from the high pressure casing, and the high pressure compression unit and the low pressure compression unit include the plurality of sections, respectively.

4. The charge gas compressor train for an ethylene plant according to claim 3, wherein the low pressure compression unit includes a larger number of sections than the high pressure compression unit.

5. The charge gas compressor train for an ethylene plant according to claim 1, wherein the steam turbine includes a rotating shaft connected concentrically to the compression unit, and a plurality of stages formed by a plurality of turbine blades arranged on an outer peripheral surface of the rotating shaft, and the steam turbine is an impulse type to apply a rotational force to the rotating shaft.

\* \* \* \* \*